C. F. PIDGIN.
MEANS FOR SHOWING SPEECH IN MOTION PICTURES.
APPLICATION FILED JAN. 28, 1919.
1,317,725.
Patented Oct. 7, 1919.
2 SHEETS—SHEET 1.
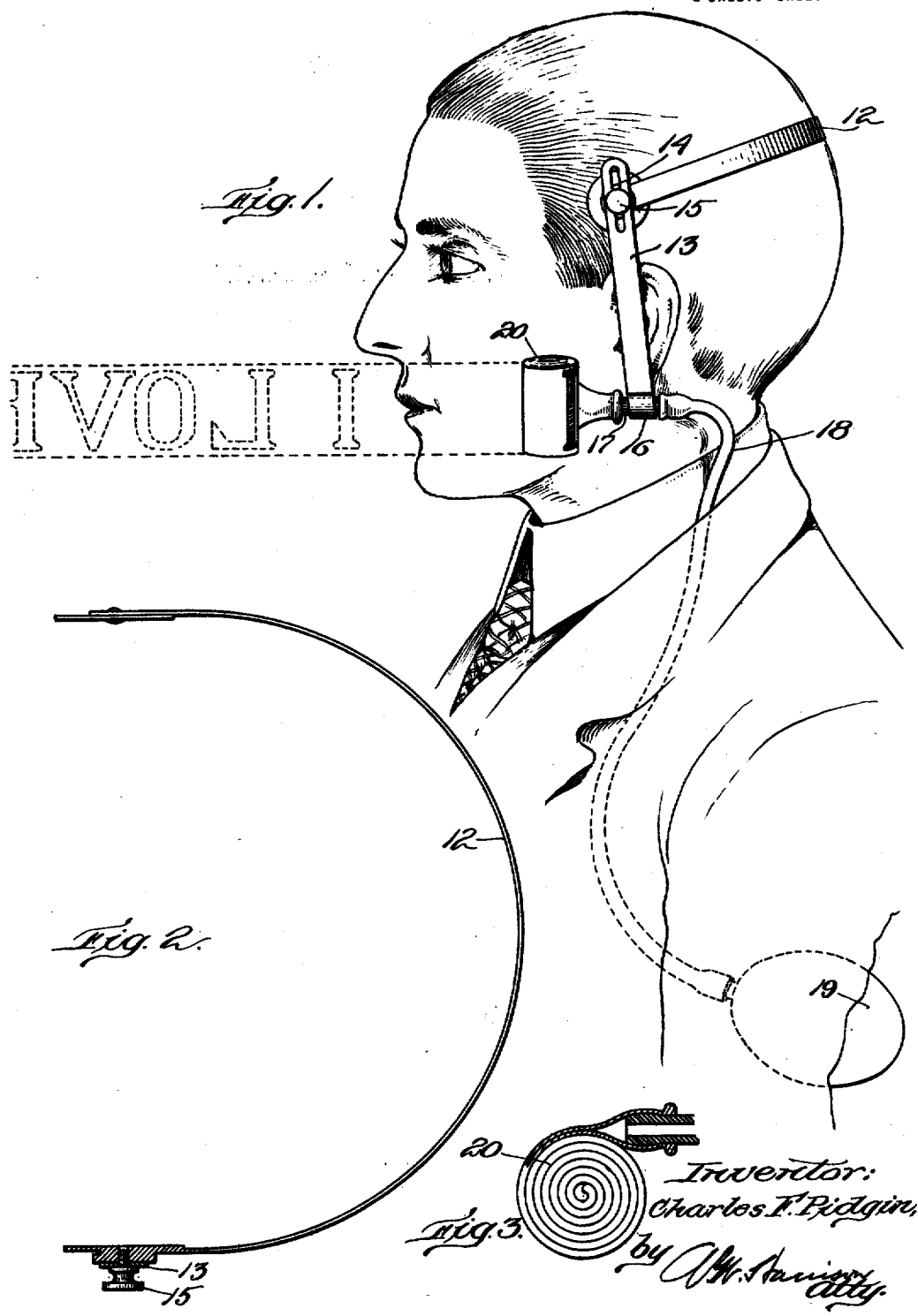

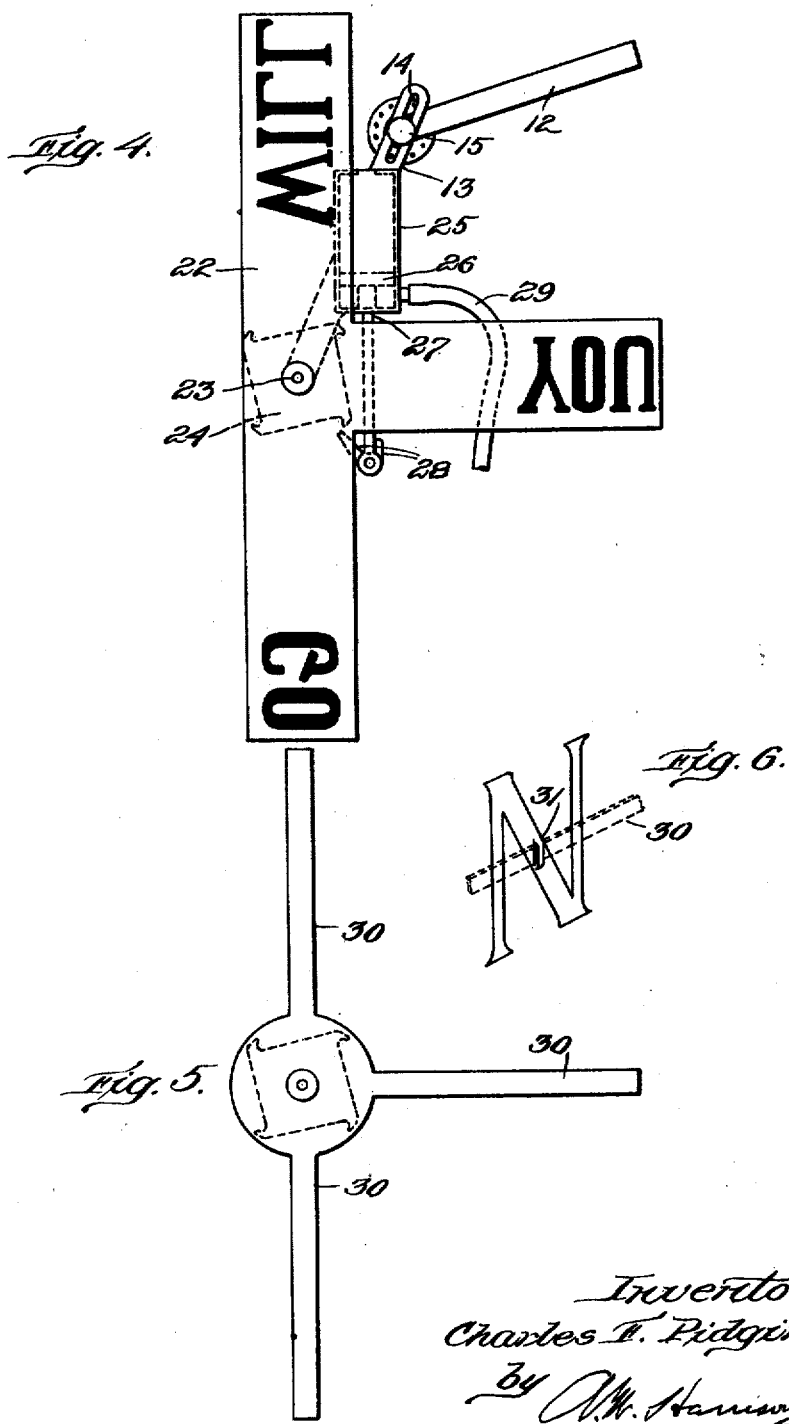

UNITED STATES PATENT OFFICE.

CHARLES F. PIDGIN, OF SILVER LAKE, MASSACHUSETTS.

MEANS FOR SHOWING SPEECH IN MOTION-PICTURES.

1,317,725. Specification of Letters Patent. Patented Oct. 7, 1919.

Application filed January 28, 1919. Serial No. 273,679.

*To all whom it may concern:*

Be it known that I, CHARLES F. PIDGIN, a citizen of the United States, and resident of Silver Lake, in the county of Plymouth and State of Massachusetts, have invented certain new and useful Improvements in Means for Showing Speech in Motion-Pictures, of which the following is a specification.

This invention relates to the art of entertaining or instructing by what are commonly known as motion pictures and wherein it is customary to exhibit to the audience a few words or short speeches to "tell the story" or accentuate the situation. Such words or sentences are employed to emphasize or explain salient features.

When the films are made from a succession of cartoons or drawings successively representing the progress of the story, it is easy to indicate the word as issuing from the mouths of the characters. But when living actors are employed it is customary to temporarily interrupt the scene and flash the supposed spoken words on the screen. Such interruptions are, of course, objectionable for many reasons; for instance they destroy the illusion of the audience that it is witnessing an actual happening.

My invention aims to overcome such objections by providing a visible appearance of the required salient words issuing from the mouth of the actor without any interruption of the action or theme, and an important feature of the invention resides in the fact that there is no interference with the facial appearance of the actor and he can actually pronounce the words which seem to be issuing from his mouth so that persons in the audience who have become somewhat expert in "lip reading" can see that he is actually speaking the visible words.

The method of accomplishing the results described consists in causing a selected arrangement of letters which will spell the accentuating words to appear from behind the actor (preferably from behind his head) and in line with or substantially opposite his mouth while the photographing is proceeding to produce that portion of the film which is to be emphasized by such words or sentences.

Of the accompanying drawings which illustrate several ways to carry out such method:—

Figure 1 is a view illustrating my invention in one embodiment thereof, said view being from a position which, in practice, would be behind the actor so that photographic views would be from the opposite side of the actor's head.

Fig. 2 is a sectional plan view of a part of the head piece shown in Fig. 1.

Fig. 3 is a detail view of one form of word carrier in normal collapsed condition.

Fig. 4 is an elevation of another form of word carrier.

Fig. 5 represents still another form of word carrier.

Fig. 6 is a perspective view illustrating how letters to form words may be removably mounted upon arms of a carrier of the Fig. 5 type.

Referring first to Figs. 1, 2 and 3, means for supporting the word carrier on a portion of the body of the actor without interfering with his use of his lips for speaking, comprises a resilient strip 12 adapted to so embrace the actor's head as to remain in position, the end of said strip which is to always be concealed from the camera having an adjustable arm 13 to which the word carrier is removably connected. As illustrated, the connection between the resilient strip and said arm consists of a binding screw 15 passing through a slot 14 in the arm into the strip 12 or into an enlargement carried by the latter.

The strip 12 may be of any suitable material, such as celluloid which may either be transparent so that the end toward the camera will not unduly contrast with the color of the actor's hair, or said strip may be colored or tinted to match his hair.

At the lower end of the adjustable arm 13 is a sleeve 16 in which is fitted a short tube 17 to the rear end of which is fitted a flexible tube 18 leading to an air bulb or bellows 19 adapted to be located under the arm of the actor. To the front end of the short tube 17 is fitted the mouth or entrance end of an inflatable spirally wound or coiled tube 20 of a type which, when inflated, will unroll and stand out straight and which, when deflated, will quickly re-coil itself. The tube 20 has painted or printed upon it the words or letters which are to constitute the salient "speech" of the actor. It may be of such a transparent nature that when the film is made and the tube is expanded only the letters will show in the photographs. When the camera is in operation and the point is reached at which it is now customary to interrupt the scene for the introduction of a separately flashed "speech", the actor simply compresses the bulb or air pump 19 and the word carrier is projected and the words photographed. The actor may, at the same time, for the sake of realism, speak those words which have been pre-arranged upon the flat tube 20. He then releases pressure on the bulb 19 which is of that character possessing a normal tendency to expand, and said bulb sucks the air back through tube 18 and the carrier recedes and re-coils itself so that the exhibited words disappear from the continuation of the film. For a different later speech a change is made in the word carriers. If the action requires the actor to turn around before the end of the scene, the entire device is so easily slipped off that it can be removed during some motion when the audience would not notice the removal.

It will be readily understood that the head piece can be applied so that the word carrier in normal position, and the arm 13, will be concealed from the camera whether the speech is to be delivered to the right or the left.

Other forms of word carriers may be employed instead of the coiled type described. For instance, as shown in Fig. 4, a three-armed rotary member made of transparent celluloid or other suitable material and bearing letters or words which will compose a sentence when rotated, is indicated at 22, said member being pivoted at 23 to the lower end of the adjustable head-piece arm 13 and having four ratchet teeth 24 which may consist of the corner portions of a rectangular piece carried by the three-armed word carrier. To actuate this form of word carrier I may employ an air cylinder 25 supported by the arm 13, a piston 26 in the cylinder having a piston rod 27 provided with a spring pawl 28 adapted to successively engage the ratchet teeth 24. To the cylinder 25, below the piston, is connected one end of an air tube 29 the other end of which is connected to an air forcing device such as that shown at 19 in Fig. 1. This form of device is to be supported substantially the same as that shown in Fig. 1, and the arm 13 so adjusted that the center of rotation of the word carrier will be at or a little below the ear of the actor. If the words carried by the arms are as shown in Fig. 4, three quick compressions of the air forcing device will rotate the word carrier step by step so that first "Will" appears in front of the mouth of the actor, then "You" and last "Go." Then a fourth actuation of the air forcing device brings the word carrier to the position shown in Fig. 4, all three arms 22 being then concealed by the head of the actor.

In Fig. 5 I illustrate a rotary three-armed member 30, to be supported and actuated similarly to the word carrier in Fig. 4, but the arms are thin and narrow and still stiff enough to carry several letters having slitted portions 31 as shown in Fig. 6. With this structure a sufficient supply of slitted letters will be carried in stock so that any desired series of words may be composed and mounted upon the arms 30, and the same device can then be used for any number of films requiring different salient "speeches."

It will now be understood that an actor (and by this term I mean to include, of course, an actor of either sex) has his lips entirely free for use in speaking the words which are photographed, if he so desires or if the director requires him to do so. At any rate there is nothing to interfere with his appearance in profile. It will also be understood that by making all portions of the device which can be "seen" by the camera of transparent material, only letters and words will be photographd.

Having now described my invention, I claim:—

1. Means for visibly indicating words supposed to be spoken by a motion picture actor, comprising a word carrier, means for normally retaining said carrier behind the actor, and means for actuating the carrier to cause the words to temporarily appear in front of the face of the actor.

2. Means for visibly indicating words issuing from the mouth of a motion picture actor, comprising a head piece, a word carrier supported by the head piece in position to be normally concealed behind the head of the actor, and means for actuating said carrier to cause the words to temporarily appear in front of the mouth of the actor.

3. An attachment for a motion picture actor to enable a photographic exhibition to be made of words employed to accentuate a dramatic situation, comprising a head piece to be worn by the actor, a word carrier movably connected to the head piece in position to be normally concealed by the head of the actor, and means for actuating said carrier to cause the words to temporarily appear in front of the mouth of the actor.

4. An attachment for a motion picture actor to enable a photographic exhibition to be made of words employed to accentuate a dramatic situation, comprising a head piece to be worn by the actor, a word carrier, means for adjustably connecting the word carrier with a portion of the head piece behind the head of the actor, and means for actuating said carrier to cause the words to temporarily appear in front of the mouth of the actor.

In testimony whereof I have affixed my signature.

CHARLES F. PIDGIN.